US012797799B2

(12) United States Patent
Kwon et al.

(10) Patent No.: US 12,797,799 B2
(45) Date of Patent: Nov. 17, 2026

(54) CARBON DIOXIDE CAPTURE AND BIOGAS UPGRADING SYSTEM USING MICROBUBBLE GENERATOR-LINKED ELECTRODEIONIZATION DEVICE

(71) Applicant: WENI CO.,LTD, Seoul (KR)

(72) Inventors: Jeonghoe Kwon, Seoul (KR); Taekyun Kim, Seoul (KR); Kangyong Yoo, Sejong (KR); Eunji Hong, Seoul (KR); Tatsiana Antukh, Dongdaemun-gu (KR)

(73) Assignee: WENI CO., LTD, Seoul (KR)

(*) Notice: Subject to any disclaimer, the term of this patent is extended or adjusted under 35 U.S.C. 154(b) by 0 days.

(21) Appl. No.: 19/374,697

(22) Filed: Oct. 30, 2025

(65) Prior Publication Data

US 2026/0183716 A1 Jul. 2, 2026

Related U.S. Application Data

(63) Continuation of application No. PCT/IB2024/063293, filed on Dec. 30, 2024.

(30) Foreign Application Priority Data

Dec. 27, 2024 (KR) ........................ 10-2024-0198765

(51) Int. Cl.

| | |
|---|---|
| ***B01D 61/46*** | (2006.01) |
| ***B01D 53/22*** | (2006.01) |
| ***B01D 53/32*** | (2006.01) |

(52) U.S. Cl.

CPC ......... *B01D 61/466* (2022.08); *B01D 53/229* (2013.01); *B01D 2257/504* (2013.01); *B01D 2258/05* (2013.01)

(58) Field of Classification Search

CPC ................ B01D 61/466; B01D 53/229; B01D 2257/504; B01D 2258/05; B01D 53/62;

(Continued)

(56) References Cited

U.S. PATENT DOCUMENTS

2004/0226654 A1* 11/2004 Hongo ................ H10P 72/0424
156/345.11
2010/0086983 A1 4/2010 Gellett et al.
(Continued)

FOREIGN PATENT DOCUMENTS

KR 20110087273 A 8/2011
KR 20130028413 A 3/2013
(Continued)

OTHER PUBLICATIONS

International Search Report dated Sep. 21, 2025 issued in PCT/IB2024/063293.

*Primary Examiner* — Qianping He

(74) *Attorney, Agent, or Firm* — Scully, Scott, Murphy & Presser, P.C.

(57) ABSTRACT

A carbon dioxide capture and biogas upgrading system using a microbubble generator-linked electro-deionization device is provided. The system has an electro-deionization device having a stack configuration having a pair of electrodes, and a bipolar membrane, a basic resin wafer, a cation exchange membrane, an acidic resin wafer, and a bipolar membrane which are arranged in the order between the electrodes, and has a process including the steps of: 1) saturating carbon dioxide of biogas in a 1% NaCl aqueous solution; 2) microbubbling carbon dioxide droplets saturated in the NaCl aqueous solution to a size of 10-50 um and dispersing same; and 3) sequentially passing the resulting biogas-NaCl aqueous solution mixture through a basic compartment and an (Continued)

acidic compartment of the cation exchange membrane (CEM)-based electro-deionization device.

15 Claims, 6 Drawing Sheets

(58) Field of Classification Search
CPC ........ B01D 53/1475; B01D 2252/1035; B01D 2321/185; B01D 2325/42; B01D 61/422; B01D 65/02; Y02C 20/40
USPC .............................................................. 95/45
See application file for complete search history.

(56) References Cited

U.S. PATENT DOCUMENTS

| | | | | |
|---|---|---|---|---|
| 2013/0233715 | A1* | 9/2013 | Lin | B01D 61/48 204/632 |
| 2018/0036685 | A1* | 2/2018 | Kunteng | B01D 61/52 |

FOREIGN PATENT DOCUMENTS

| | | | |
|---|---|---|---|
| KR | 101508207 | B1 | 4/2015 |
| KR | 101522317 | B1 | 5/2015 |
| KR | 101541994 | B1 | 8/2015 |
| KR | 1020230122260 | A | 8/2023 |
| KR | 1020240114573 | A | 7/2024 |
| KR | 102774627 | B1 | 3/2025 |

* cited by examiner

CARBON DIOXIDE CAPTURE AND BIOGAS UPGRADING SYSTEM USING MICROBUBBLE GENERATOR-LINKED ELECTRODEIONIZATION DEVICE

TECHNICAL FIELD

The present invention relates to a system for capturing carbon dioxide and upgrading biogas using a microbubble generator-linked electrodeionization device, and more particularly, relates to a system for capturing carbon dioxide in biogas and upgrading the biogas by using a cation separator-based electrodeionization process and a microbubble generating device.

BACKGROUND ART

Due to the obligation to reduce carbon dioxide and the like, which are a main cause of the recent increase in greenhouse gases, interest has been increasing in the utilization of biogas, which is a mixture of methane, carbon dioxide, and other gases generated when organic waste such as food waste, sewage sludge, and animal excrement is decomposed.

In biogas generated in an anaerobic digester of a biogas production facility that uses food waste and food waste liquid as a mixed feedstock, 5 to 60% of methane gas and 35 to 40% of carbon dioxide are included, and such biogas is consumed as 32% for external supply, 17% for power generation, and the rest for self-heating sources around the production facility or is combusted through a flare stack, whereby the biogas is not being used efficiently.

Further, recently, beyond CCS (Carbon Capture & Storage) technology that simply captures and stores carbon dioxide, interest has been increasing in CCU (Carbon Capture & Utilization) research that recycles the carbon dioxide by upgrading it with high added value.

Accordingly, research and development on biogas upgrade for increasing the content of methane by separating or capturing carbon dioxide of biogas has been actively conducted.

In order to separate carbon dioxide from biogas, wet separation processes using water and adsorption processes using a catalyst are mainly employed; however, due to much water and catalyst used, high costs are required, and the purity of the captured carbon dioxide is about 90%, which is a low purity unsuitable for reuse.

Electrodeionization (EDI) is an applied technology that combines electrodialysis and ion exchange and has been used since the late 1950s with the purpose of minimizing the concentration polarization phenomenon existing in the electrodialysis process.

An electrodeionization cell forms a dilution compartment and a concentration compartment by alternately arranging a cation-exchange membrane (CEM) and an anion exchange membrane (AEM) between an anode and a cathode.

An ion exchanger filled in the dilution compartment of the electrodeionization cell performs a conductor role due to the existence of functional groups that play a bridging role between the ion separation membranes, thereby offsetting the concentration polarization of electrodialysis (ED).

Resin Wafer Electrodeionization (RW-EDI), which is an electrodeionization using a resin wafer in which a porous ion exchange resin of the electrodeionization process is made in a wafer form, achieves improvement of electric efficiency and increase of separation efficiency because gas-liquid exchange is well performed due to the high surface area of the resin wafer.

The present invention was completed by focusing on the fact that the biogas may be upgraded by capturing only the carbon dioxide in the biogas by linking a cation-exchange membrane (CEM)-based electrodeionization process and a microbubble device.

DOCUMENTS OF RELATED ART

Patent Documents

Korean Patent No. 10-1522317 (May 15, 2015)
Korean Patent Application Publication No. 10-2024-0114573 (Jul. 24, 2024)
Korea Patent No. 10-1541994 (Jul. 29, 2015)

SUMMARY

Technical Problem

The present invention is directed to providing a microbubble generator-linked electrodeionization technology capable of capturing carbon dioxide in biogas produced from an anaerobic digestion facility using food waste and food waste liquid mixed feedstock with high purity and simultaneously upgrading the biogas.

The present invention is directed to providing a microbubble generator-linked electrodeionization technology capable of reducing costs related to production and maintenance of a biogas production facility and reducing energy consumption by capturing carbon dioxide in biogas so as to enable reuse.

The present invention is directed to providing a microbubble generator-linked electrodeionization technology capable of contributing to carbon neutrality through carbon dioxide reduction by capturing carbon dioxide in biogas with high purity so as to enable reuse.

Technical Solution

In order to achieve the above objects, the present invention more specifically provides the following.

The present invention, in a system for capturing carbon dioxide from biogas and upgrading biogas, comprises a process including: 1) saturating carbon dioxide of biogas in a 1% NaCl aqueous solution; 2) microbubbling carbon dioxide bubbles (or droplets) saturated in the NaCl aqueous solution into a size of 10 to 50 μm and dispersing the same; and 3) sequentially passing a mixture of biogas and NaCl aqueous solution through a basic compartment and an acidic compartment of a cation exchange membrane (CEM)-based electrodeionization device.

As the mixture of biogas and NaCl aqueous solution passes through the basic compartment of the electrodeionization device, pH shifts to basic (alkaline) so that the carbon dioxide in the biogas is converted to bicarbonate, and the methane in the biogas remains in a gaseous state.

After the methane in the biogas is separated in a gaseous state, the NaCl aqueous solution rich in bicarbonate passes through the acidic compartment of the electrodeionization device, whereby the pH shifts to acidic so that the bicarbonate in the NaCl aqueous solution is converted into gaseous carbon dioxide.

The electrodeionization device has a stack configuration having a pair of electrodes and a bipolar membrane (BP), a basic resin wafer (BRW), a cation exchange membrane (CEM), an acidic resin wafer (ARW), and a bipolar membrane (BP) which are sequentially arranged between the electrodes.

The basic compartment and the acidic compartment of the electrodeionization device are separated by the cation exchange membrane (CEM), a fluid flow path in the basic compartment is formed in the basic resin wafer (BRW), and a fluid flow path in the acidic compartment is formed in the acidic resin wafer (ARW).

In the saturating of the carbon dioxide of the biogas in the 1% NaCl aqueous solution, the flow rate ratio (carbon dioxide mL/NaCl aqueous solution mL) is set to 0.6.

The internal stack voltage of the electrodeionization device is set to 2 V.

Advantageous Effects

The system for capturing carbon dioxide and upgrading biogas using the microbubble generator-linked electrodeionization device according to the present invention has an effect of reducing costs related to production and maintenance of a biogas production facility and reducing energy consumption by capturing carbon dioxide, which accounts for 40% of biogas, so as to enable reuse.

In addition, the captured high-purity carbon dioxide may be used for the growth of thermophilic hydrogenotrophic methanogens of the biogas production facility, and when liquefied, has an effect of obtaining ultra-high-purity carbon dioxide usable also for semiconductor manufacturing.

In addition, the technology of capturing and reusing carbon dioxide through the system of the present invention has an effect of contributing to carbon neutrality policies and greenhouse gas reduction policies in progress worldwide.

DESCRIPTION OF REFERENCE NUMERALS

Figure 1:
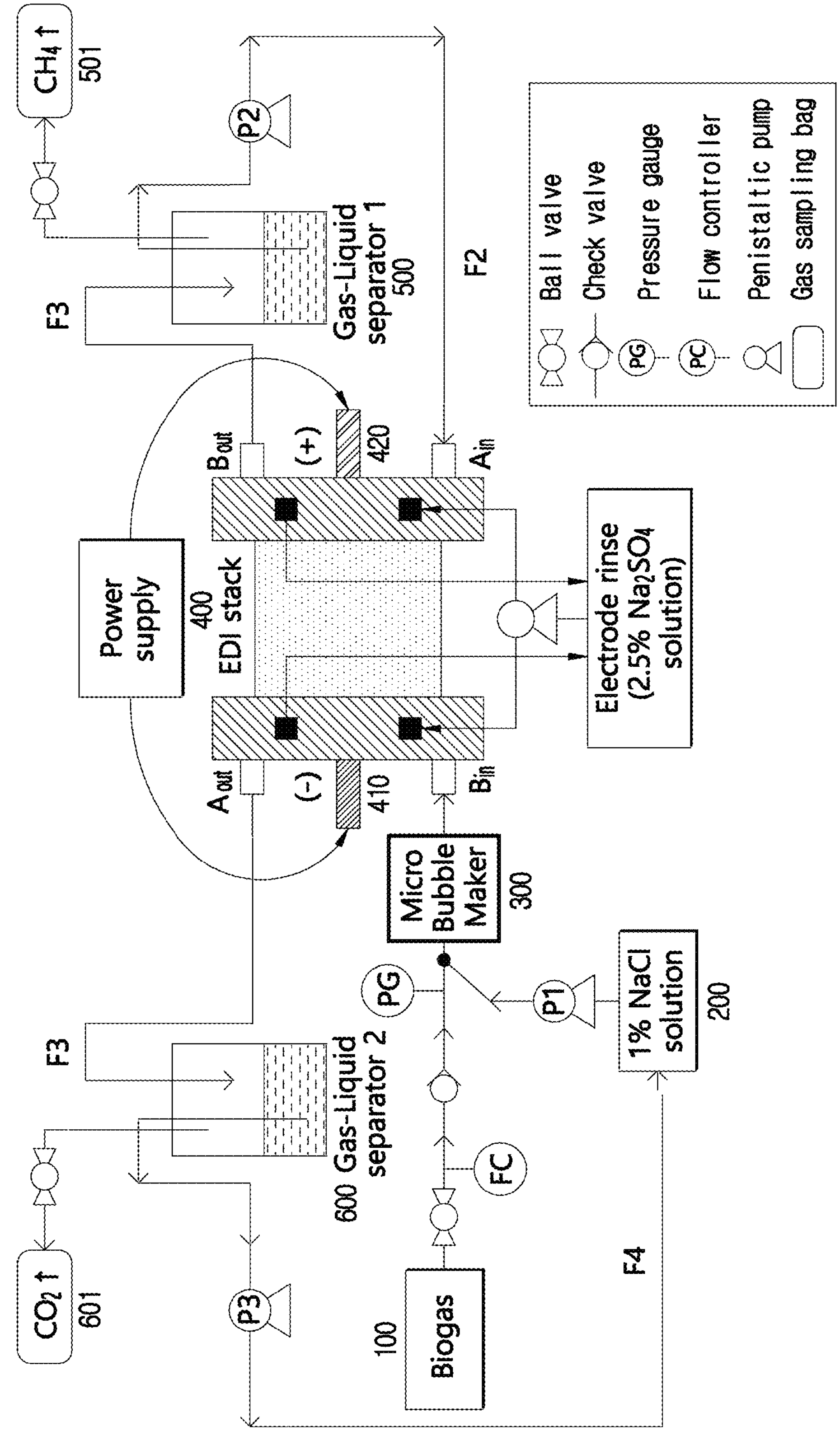
FIG. 1 is an overall configuration and process flow diagram of an RW-EDI $CO_2$ capturing system according to one embodiment of the present invention.

100: Biogas
200: 1% NaCl aqueous solution
300: microbubble generator
400: electrodeionization device (RW-EDI stack)
410: Cathode
420: Anode
430: Bipolar membrane (BP)
440: Basic resin wafer (BRW)
441: Basic compartment
450: Cation exchange membrane (CEM)
460: Acidic resin wafer (ARW)
461: Acidic compartment
470: Bipolar membrane (BP)
500: Gas-liquid separator 1
501: Separated methane gas
600: Gas-liquid separator 2
601: Released carbon dioxide
F1: Mixture of carbonate-rich 1% NaCl aqueous solution and methane gas
F2: Carbonate-concentrated process liquid
F3: Acidified liquid containing gaseous carbon dioxide
F4: Decarbonated 1% NaCl aqueous solution

DETAILED DESCRIPTION

Hereinafter, specific contents for carrying out the present invention will be described with reference to the accompanying drawings. Further, in the description of the present invention, the specific descriptions of publicly known related functions will be omitted when it is determined that the specific descriptions may unnecessarily obscure the subject matter of the present invention.

With reference to the terms used in the description, the RW-EDI $CO_2$ capturing system is an abbreviation of the system for capturing carbon dioxide and upgrading biogas using a microbubble generator-linked electrodeionization device, the % concentration of the NaCl aqueous solution means weight percent (wt %), and the % concentration for each component of the biogas means volume percent (vol %) for each component.

Figure 2:
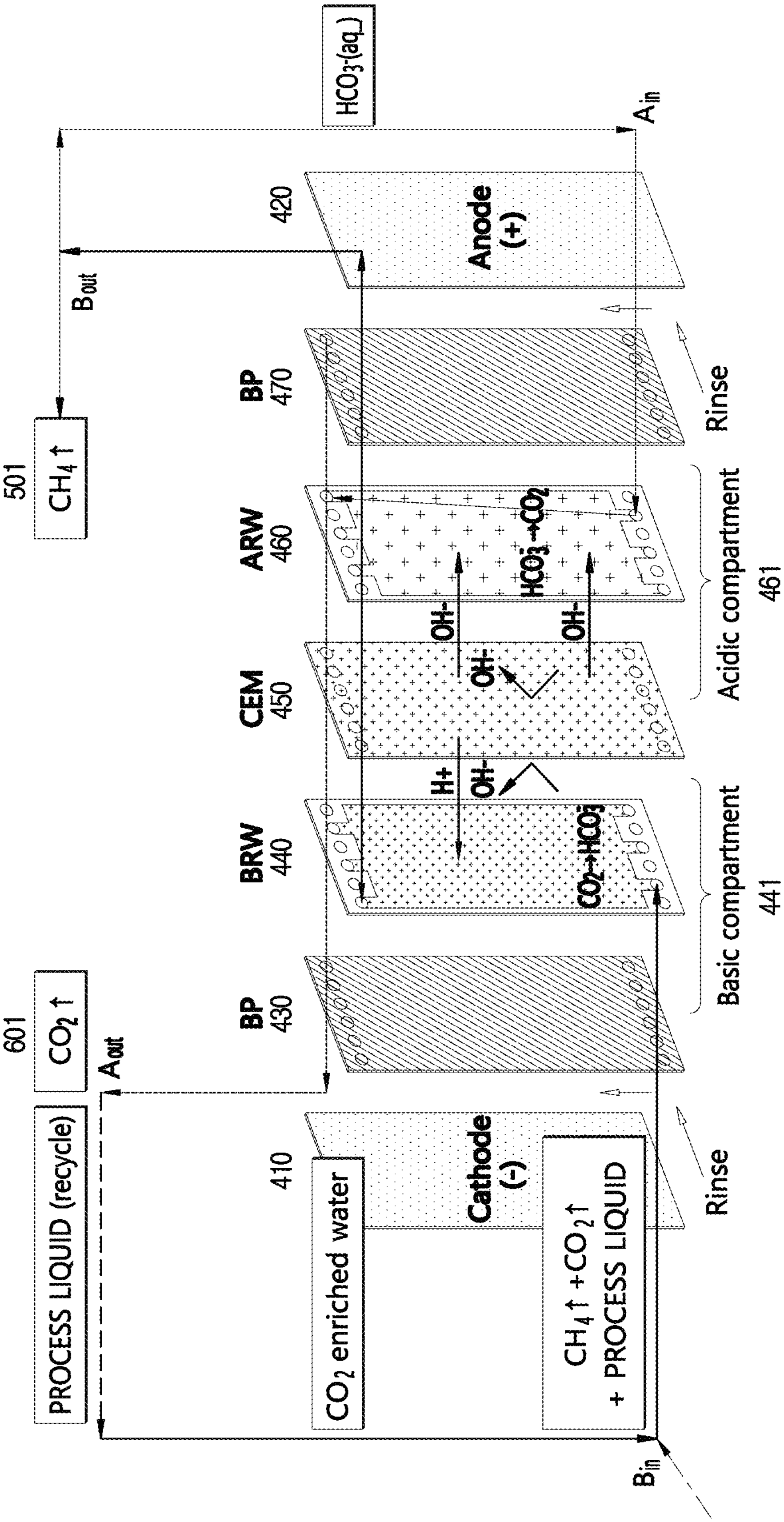
FIG. 2 is a configuration inside an RW-EDI stack and a fluid flow diagram of the RW-EDI $CO_2$ capturing system according to one embodiment of the present invention.
Figure 3:
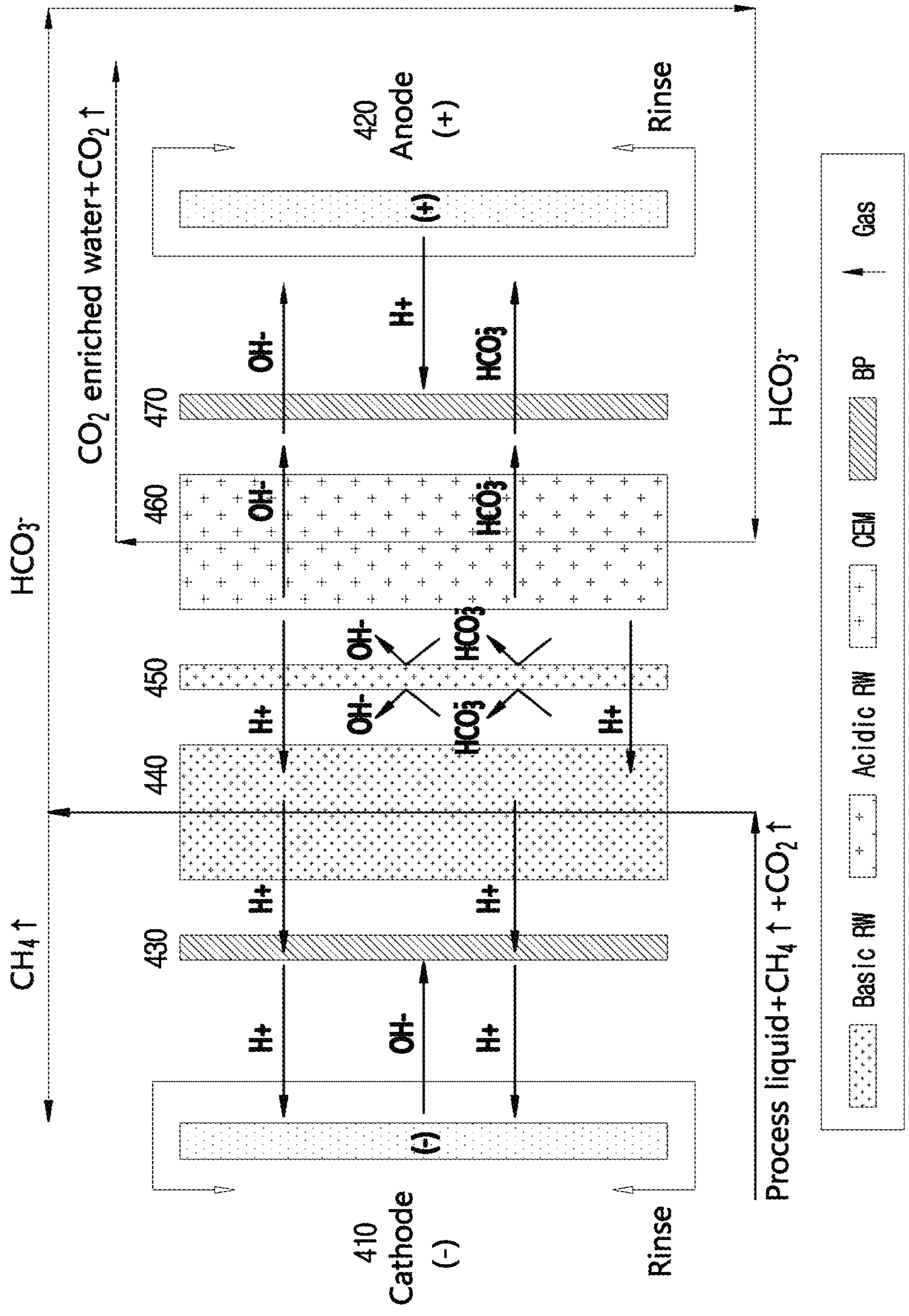
FIG. 3 is an ion fluid flow diagram inside an RW-EDI stack of the RW-EDI $CO_2$ capturing system according to one embodiment of the present invention.
Figure 4:
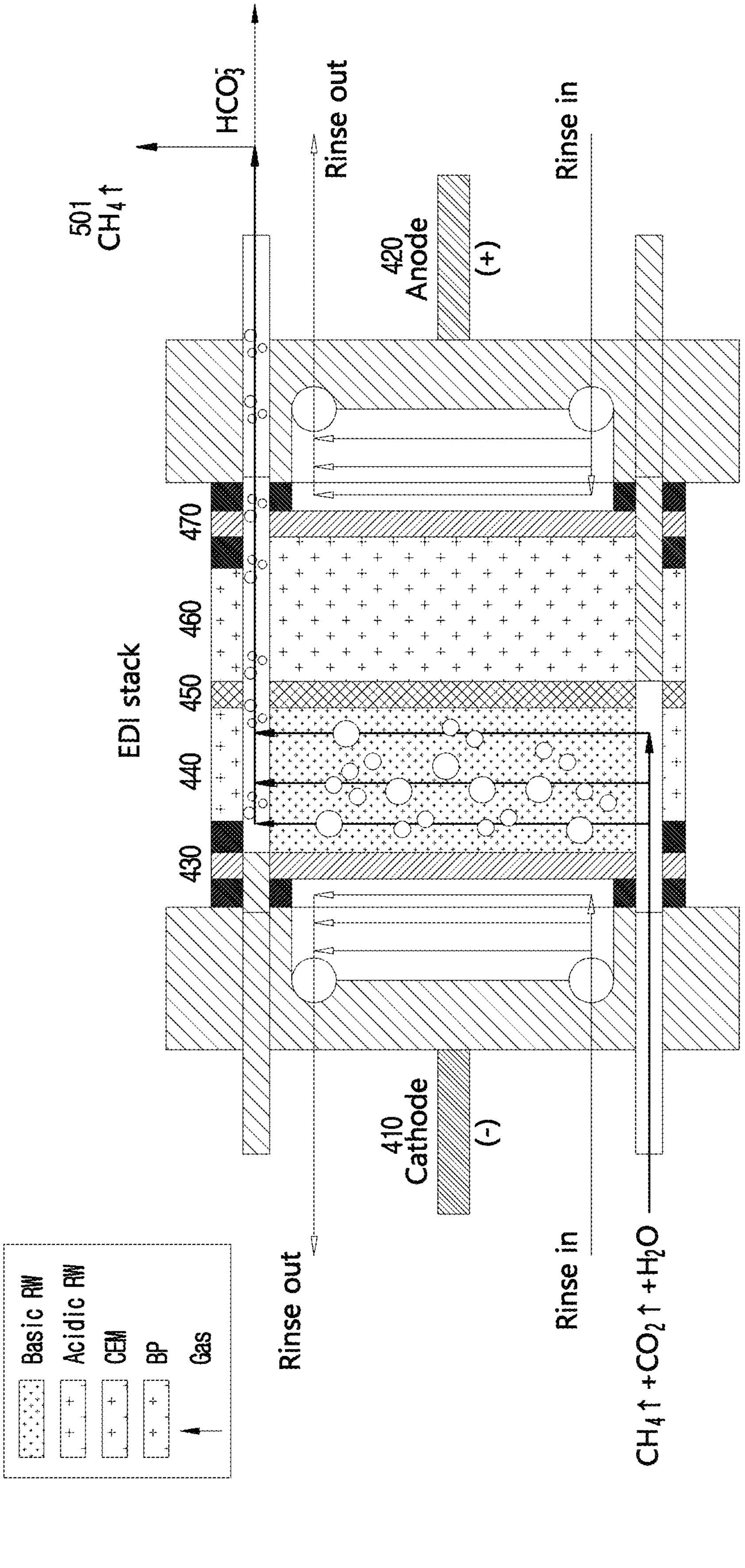
FIG. 4 is a basic flow and biogas fluid flow diagram inside an RW-EDI stack of the RW-EDI $CO_2$ capturing system according to one embodiment of the present invention.
Figure 5:
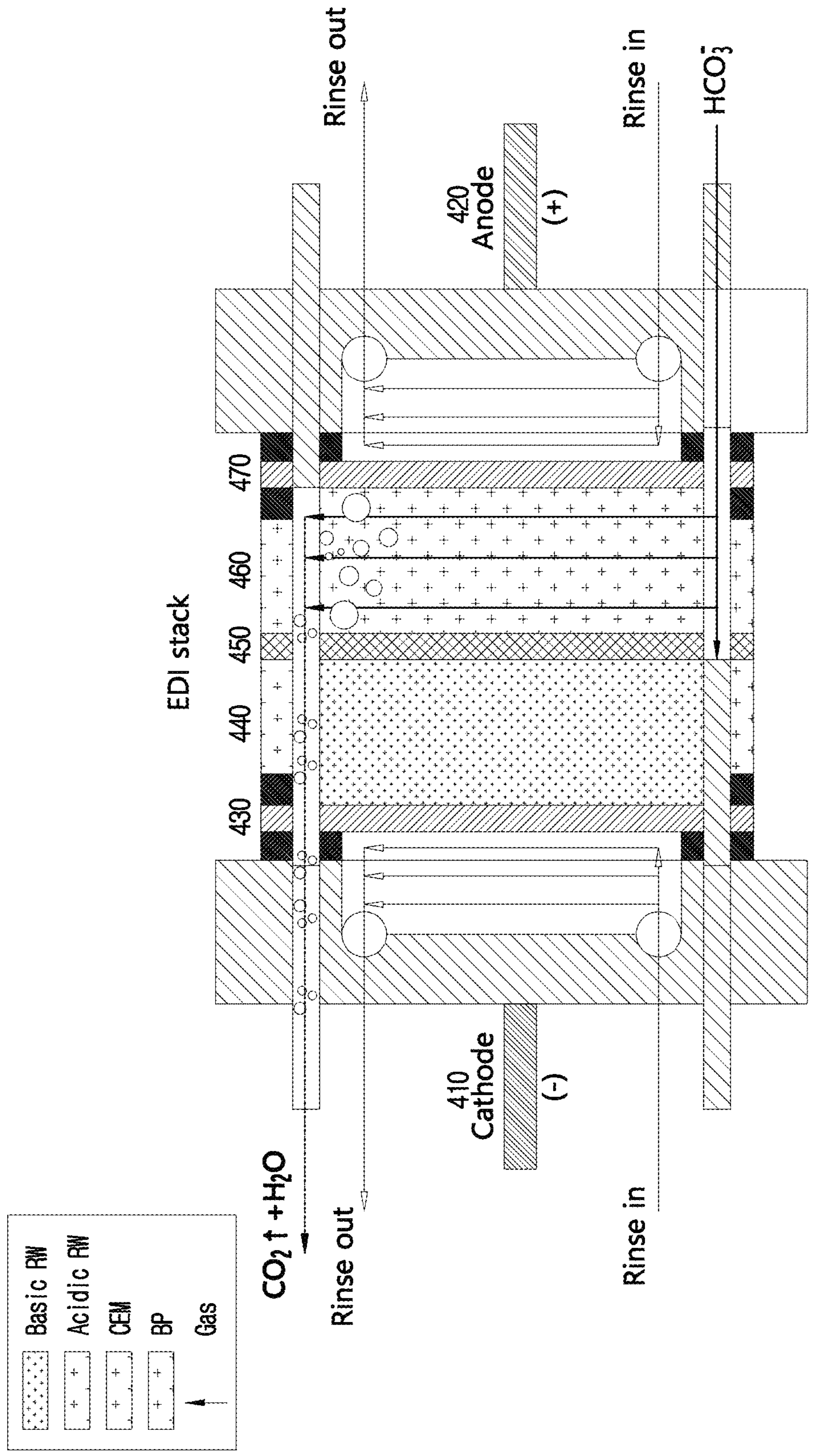
FIG. 5 is an acidic flow and carbon dioxide fluid flow diagram inside an RW-EDI stack of the RW-EDI $CO_2$ capturing system according to one embodiment of the present invention.

FIG. 1 is an overall configuration and process flow diagram of an RW-EDI $CO_2$ capturing system according to one embodiment of the present invention, FIG. 2 is a configuration inside an RW-EDI stack and a fluid flow diagram of the RW-EDI $CO_2$ capturing system according to one embodiment of the present invention, FIG. 3 is an ion fluid flow diagram inside an RW-EDI stack of the RW-EDI $CO_2$ capturing system according to one embodiment of the present invention, FIG. 4 is a basic flow and biogas fluid flow diagram inside an RW-EDI stack of the RW-EDI $CO_2$ capturing system according to one embodiment of the present invention, and FIG. 5 is an acidic flow and carbon dioxide fluid flow diagram inside an RW-EDI stack of the RW-EDI $CO_2$ capturing system according to one embodiment of the present invention.

The RW-EDI $CO_2$ capturing system according to one embodiment of the present invention is configured with a process of upgrading the biogas (increasing the purity of methane in the biogas) by capturing only carbon dioxide in the biogas 100 produced from an anaerobic digestion facility using food waste and food waste liquid mixed feedstock through treatment with the microbubble generator 300-linked electrodeionization device 400.

The biogas 100 treated according to one embodiment of the present invention is composed of 57 to 61% of methane, 38 to 42% of carbon dioxide, and 1% of other components.

The electrodeionization device 400 according to one embodiment of the present invention has a stack configuration having a pair of electrodes 410 and 420 and, a bipolar membrane (BP) 430, a basic resin wafer (BRW) 440, a cation exchange membrane (CEM) 450, an acidic resin wafer (ARW) 460, and a bipolar membrane (BP) 470 which are sequentially arranged between the electrodes.

Summarizing again, the electrodeionization device 400 according to one embodiment of the present invention is configured with a pair of cells including one basic resin wafer (BRW) 440 and one acidic resin wafer (ARW) 460 separated by the cation exchange membrane (CEM) 450, and the basic resin wafer (BRW) 440 and the acidic resin wafer (ARW) 460 are respectively separated from the electrodes 410 and 420 by the bipolar membranes (BP) 430 and 470.

The basic resin wafer (BRW) 440 and the acidic resin wafer (ARW) 460 according to one embodiment of the present invention are assembled with a 4 mm PE gasket covered with EVA foam of a total thickness of 7.4 mm, and are formed with a size of length×width×thickness=175×120×7.3 mm.

The basic resin wafer (BRW) 440 and the PE EVA foam gasket form the basic compartment 441 of the electrodeionization device 400, and the acidic resin wafer (ARW) 460 and the PE EVA foam gasket form the acidic compartment 461, and these basic compartment 441 and acidic compartment 461 are separated by the cation exchange membrane (CEM) 450.

The fluid flow path in the basic compartment 441 is formed in the basic resin wafer (BRW) 440, and the fluid flow path in the acidic compartment 461 is formed in the acidic resin wafer (ARW) 460.

The designed range of pH variation in the electrodeionization device 400 according to one embodiment of the present invention is pH 3 to 4 in the acidic compartment and pH 9 to 11 in the basic compartment.

In a chemical solution (such as sodium chloride solution, sulfuric acid solution, hydrochloric acid solution, etc.) including water, the concentration of carbon dioxide and bicarbonate/carbonate greatly depends on pH.

All carbon dioxide is converted into carbonate and bicarbonate at pH 9 or higher, and at pH 4 or lower, bicarbonate/carbonate does not exist (Pismenskaya et al., 2020). Accordingly, by controlling electrochemical pH variation, carbon dioxide may be captured under basic conditions and released under acidic conditions.

Figure 6:
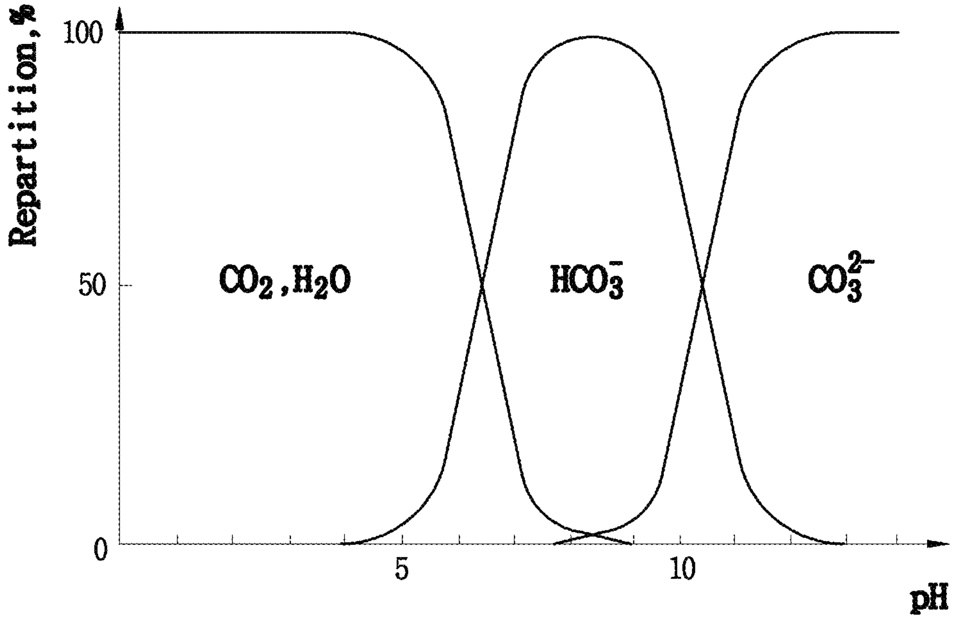
FIG. 6 is a graph showing repartition of carbonate according to pH.

The following chemical formulas represent the change process of carbon dioxide according to pH of an aqueous solution, and FIG. 6 is a graph showing repartition of carbonate according to pH.

$$H_2O \longleftrightarrow H^+ + OH^-$$

$$CO_2\,(g) + H_2O \longleftrightarrow CO_2\,(aq) + H_2O \longleftrightarrow H_2CO_3 \longleftrightarrow H^+ + HCO_3^-$$

$$CO_2\,(aq) + OH^- \longleftrightarrow HCO_3$$

$$HCO_3^- + H^+ \longleftrightarrow H_2O + CO_2\,(g)$$

The RW-EDI $CO_2$ capturing system according to one embodiment of the present invention is configured such that carbon dioxide included in biogas 100 is saturated in a 1% NaCl aqueous solution at the front end of the electrodeionization device and then passes through the microbubble generator 300.

The 1% NaCl aqueous solution is a process liquid designed as an optimum concentration for capturing and releasing carbon dioxide from biogas including carbon dioxide of 40±2%.

In the 1% NaCl aqueous solution, the $Na^+$ ion concentration is 0.1741 mol/L, and this concentration contains a sufficient amount of Nations as counter ions of $HCO_3^-$, $CO_3^{2-}$, and $OH^-$, and the ion concentration of the 1% NaCl aqueous solution is also sufficiently high in electrical conductivity so that the electrical conductivity is 18.6 mS/m.

Although a high-concentration NaCl aqueous solution has an advantage in reducing operating costs of the system by enabling reuse through circulation of the process liquid in the system, a problem occurs in that as the salinity increases, the solubility of carbon dioxide decreases and accordingly regeneration of the membrane is required more frequently.

Meanwhile, the maximum solubility of carbon dioxide in water at 20 °C is carbon dioxide 88 mL/water 100 mL, so that the ratio of carbon dioxide/water is 0.88, but the solubility of carbon dioxide in the 1% NaCl aqueous solution is lower than that in water, and considering that the supply temperature of the 1% NaCl aqueous solution according to one embodiment of the present invention is 22 to 25 °C, in the RW-EDI $CO_2$ capturing system according to one embodiment of the present invention, the flow rate ratio of carbon dioxide/1% NaCl aqueous solution is controlled to 0.8 or less in order to obtain the maximum solubility of carbon dioxide for the 1% NaCl aqueous solution.

The microbubble generator 300 is a device that plays a role of finely dividing gas bubbles by rotating a screw when liquid and gas are mixed and simultaneously injected at the feed part, and in the RW-EDI $CO_2$ capturing system according to one embodiment of the present invention, the carbon dioxide saturated in the 1% NaCl aqueous solution is dispersed into air bubbles of 10 to 50 μm in size to greatly increase the reaction area, thereby enabling the electrodeionization device 400 at the rear end to increase the capturing speed, capturing amount, and capturing purity of carbon dioxide.

The microbubble generator 300 according to one embodiment of the present invention may be designed with a simple structure such as the stack of the electrodeionization device 400 so as to increase the number and size and to be designed to fit into various spaces, thereby further enhancing space utilization.

The gas-liquid mixture that has passed through the microbubble generator 300 passes through the basic compartment 441 of the electrodeionization device 400, where the pH shifts to basic, whereby carbon dioxide is converted to bicarbonate, whereas methane remains in a gaseous state.

Then, the mixture F1 of the carbonate-rich 1% NaCl aqueous solution and methane gas leaves the electrodeionization device 400, moves to the gas-liquid separator 1 500, and is separated into gas and liquid.

The separated methane gas is collected in a Tedlar sampling bag and analyzed with GC-TCD, and the carbonate-concentrated process liquid F2 moves to the acidic compartment 461 of the electrodeionization device 400, where the pH shifts to acidic and the bicarbonate is converted into gaseous carbon dioxide.

The acidified liquid F3 containing gaseous carbon dioxide leaves the electrodeionization device 400, moves to the gas-liquid separator 2 600, releases carbon dioxide, and the released carbon dioxide is collected in a gas Tedlar bag and analyzed with GC-TCD.

The decarbonated 1% NaCl aqueous solution F4 is recycled for additional operation, and the concentration of carbon dioxide, carbonate, and bicarbonate in the 1% NaCl aqueous solution is measured as total inorganic carbon using TOC-VCPH.

Experimental Example 1

Experiment on carbon dioxide capturing efficiency according to flow rate ratio of carbon dioxide/1% NaCl aqueous solution and application/non-application of the microbubble generator In the RW-EDI $CO_2$ capturing system according to one embodiment of the present invention operated as described above, since the carbon dioxide concentration of the supplied biogas 100 is high (about 40%), it is important to increase the contact area of carbon dioxide gas and the 1% NaCl aqueous solution in order to increase the solubility of carbon dioxide in the 1% NaCl aqueous solution; however, due to the solubility of carbon dioxide in the 1% NaCl aqueous solution, the saturation amount of carbon dioxide for the 1% NaCl aqueous solution is limited, so, as mentioned above, the flow rate ratio of carbon dioxide/1% NaCl aqueous solution has to be controlled to 0.8 or less, and in order to find the optimum flow rate ratio condition, experiments were conducted with three flow rate ratios of 0.4, 0.6, and 0.8.

In addition, since the microbubble generator 300 is installed to provide better gas distribution and higher contact between the process liquid and the resin wafer, its installation effect was combined with the above flow rate ratios and tested together.

For this experiment, the biogas 100 is supplied to the system at a pressure of 1 to 1.1 bar, the microbubble generator 300 uses a commercial product distributed domestically, the cation exchange membrane (CEM) 450 of the electrodeionization device 400 uses NEOSEPTA of ASTOM (Japan), the internal stack voltage of the electrodeionization device 400 is set to 2±0.1 V (electrode voltage 10±0.4 V), and the operating time of the system is set to 4 cycles (120 minutes).

Table 1 below shows the experimental results for the carbon dioxide capturing efficiency according to the flow rate ratio of carbon dioxide/1% NaCl aqueous solution and the application/non-application of the microbubble generator.

TABLE 1

| 1% NaCl flow rate (mL/min) | Biogas flow rate (cc/min) | Ratio of Carbon dioxide/ 1% NaCl | Capturing efficiency(%) Non-application of micro-bubble generator | Capturing efficiency(%) Application of micro-bubble generator | Capturing efficiency(%) Improvement in capturing efficiency (%) |
|---|---|---|---|---|---|
| 100 | 200 | 0.8 | 66.8 | 74.2 | 7.4 |
| 100 | 150 | 0.6 | 67.4 | 78.7 | 11.3 |
| 100 | 100 | 0.4 | 73.1 | 84.4 | 11.3 |
| 50 | 100 | 0.8 | 68.2 | 77.8 | 9.6 |
| 50 | 75 | 0.6 | 76.5 | 86.7 | 10.2 |
| 50 | 50 | 0.4 | 79.9 | 92.7 | 12.8 |
| 3 | 60 | 0.8 | 68.9 | 82.1 | 13.2 |
| 3 | 45 | 0.6 | 80.8 | 90.1 | 9.3 |
| 30 | 30 | 0.4 | 88.1 | 93.8 | 5.7 |
| 15 | 30 | 0.8 | 76.4 | 94.1 | 17.7 |
| 15 | 22.5 | 0.6 | 80.7 | 99.2 | 18.5 |
| 15 | 15 | 0.4 | 96.4 | 99.4 | 3.0 |
| 10 | 20 | 0.8 | 75.8 | 94.3 | 18.5 |

TABLE 1-continued

| 1% NaCl flow rate (mL/min) | Biogas flow rate (cc/min) | Ratio of Carbon dioxide/ 1% NaCl | Capturing efficiency(%) Non-application of micro-bubble generator | Capturing efficiency(%) Application of micro-bubble generator | Capturing efficiency(%) Improvement in capturing efficiency (%) |
|---|---|---|---|---|---|
| 10 | 15 | 0.6 | 81.9 | 99.7 | 17.8 |
| 10 | 10 | 0.4 | 97.1 | 99.9 | 2.8 |

According to the results of this experiment, on average, the microbubble generator 300 increased the capturing efficiency by 13.3% at a carbon dioxide/1% NaCl aqueous solution flow rate ratio of 0.8, increased by 13.4% at 0.6, and increased by 7.1% at 0.4, thereby showing the largest capturing efficiency increase at the flow rate ratio of 0.6.

Experimental Example 2

Experiment on purity of released carbon dioxide according to internal stack voltage of electrodeionization device The voltage required for the reaction $H_2O \leftrightarrow H^- + OH^-$ at the bipolar membrane (BP) of the electrodeionization device 400 according to one embodiment of the present invention is 1.2 V.

Along with this, for efficient capturing and releasing of carbon dioxide included in the biogas 100, the pH of the electrodeionization device 400 according to one embodiment of the present invention should be changed to 9 or higher in the basic compartment 441 and 4 or lower in the acidic compartment 461, and this pH change was confirmed at a minimum internal stack voltage of 1.5 V of the electrodeionization device 400.

That is, when the internal stack voltage was lower than 1.5 V, there was a change in pH, but in the basic compartment 441, the pH was 8.7±0.2, and the pH did not increase to 9 or higher, and in the acidic compartment 461, the pH was 5±0.4, and the pH did not decrease to 4 or lower.

Therefore, an experiment on the purity of released carbon dioxide according to the internal stack voltage of the electrodeionization device 400 was conducted to find an appropriate internal stack voltage.

For this experiment, the carbon dioxide/1% NaCl aqueous solution flow rate ratio of the system was set to 0.6 (biogas flow rate 45 cc/min, 1% NaCl aqueous solution flow rate 30 mL/min), and the internal stack voltage was set to 1.5 V, 2 V, 2.5 V, and 3 V, respectively, and the other experimental conditions were set the same as those of Experimental Example 1 above.

To maintain an internal stack voltage of 1.5 V, an electrode voltage of 8.7±0.2 V was used, to maintain an internal stack voltage of 2 V, an electrode voltage of 10±0.4 V was used, to maintain an internal stack voltage of 2.5 V, an electrode voltage of 12±0.2 V was used, and to maintain an internal stack voltage of 3 V, an electrode voltage of 15±0.3 V was used. The applied current was maintained in the range of 1.75±0.3 A.

Table 2 below shows the experimental results on the purity of released carbon dioxide according to the internal stack voltage of the electrodeionization device.

TABLE 2

| Reaction | Voltage | | | | | | | | | | | |
|---|---|---|---|---|---|---|---|---|---|---|---|---|
| time | 1.5 V | | | 2 V | | | 2.5 V | | | 3 V | | |
| (30 min/ cycle) | $CO_2$ (%) | $CH_4$ (%) | $N_2$ (%) | $CO_2$ (%) | $CH_4$ (%) | $N_2$ (%) | $CO_2$ (%) | $CH_4$ (%) | $N_2$ (%) | $CO_2$ (%) | $CH_4$ (%) | $N_2$ (%) |
| 0 | 0 | 0 | 100 | 0 | 0 | 100 | 0 | 0 | 100 | 0 | 0 | 100 |
| 1 | 40.32 | 2.8 | 56.88 | 98.4 | 0.02 | 1.58 | 96.89 | 0.14 | 2.97 | 91.98 | 6.07 | 1.95 |
| 2 | 61.8 | 3.1 | 35.10 | 96.32 | 2.15 | 1.53 | 92.1 | 5.49 | 2.41 | 86.16 | 12.35 | 1.49 |

TABLE 2-continued

| Reaction time (30 min/ cycle) | Voltage | | | | | | | | | | | |
|---|---|---|---|---|---|---|---|---|---|---|---|---|
| | 1.5 V | | | 2 V | | | 2.5 V | | | 3 V | | |
| | $CO_2$ (%) | $CH_4$ (%) | $N_2$ (%) | $CO_2$ (%) | $CH_4$ (%) | $N_2$ (%) | $CO_2$ (%) | $CH_4$ (%) | $N_2$ (%) | $CO_2$ (%) | $CH_4$ (%) | $N_2$ (%) |
| 3 | 75.46 | 3.45 | 21.09 | 97.33 | 2.45 | 0.22 | 88.63 | 10.37 | 1.00 | 87.21 | 12.01 | 0.78 |
| 4 | 84.22 | 5.42 | 10.36 | 97.65 | 2.31 | 0.04 | 86.75 | 12.95 | 0.3 | 86.74 | 13.21 | 0.05 |
| Average | 65.45 | 3.69 | 30.86 | 97.43 | 1.73 | 0.84 | 91.09 | 7.24 | 1.67 | 88.02 | 10.91 | 1.07 |

According to the results of this experiment, when the internal voltage of the stack was set to 2 V, the purity of the released carbon dioxide was the highest at 97.43%, and at the internal stack voltages of 2.5 V and 3 V, it was confirmed that the purity of the released carbon dioxide decreased due to gases inside the stack crossing each other and becoming contaminated as a result of increased membrane permeability to gas.

In addition, it was confirmed that the optimum operating time of the system was 4 cycles (120 minutes), and after 4 cycles (120 minutes), the resistance of the membrane increased, and a higher applied voltage was required to maintain 2 V inside the stack, so that a process of washing and reactivating the cation exchange membrane (CEM) 450 and the resin wafers 440 and 460 was required.

The reactivation of the cation exchange membrane (CEM) 450 and the resin wafers 440 and 460 was carried out by the following process.

1) Stop the supply of biogas, 1% NaCl aqueous solution, and electricity, and replace the 1% NaCl aqueous solution with distilled water.
2) Wash the system with distilled water for 2 minutes without applying current.
3) While washing the inside of the stack with distilled water, apply a voltage of 4 to 5 V and a current of 3 A for 10 minutes. After completion of the above washing, stop the supply of electricity and rinse the inside of the stack with distilled water for 10 minutes (repeated 3 times).

In addition, it was confirmed that the cation exchange membrane (CEM) 450 used in the electrodeionization process showed a decrease in reaction rate from the fifth use, and when washed with rinse solution every four uses and reused, it returned to its original state and could be used semi-permanently. In addition, it was confirmed that the rinse solution could be reused at least 15 times and up to 20 times.

As described above, although the technical idea of the present invention has been described with the accompanying drawings, this is merely an exemplary explanation of a preferred embodiment of the present invention and is not intended to limit the present invention. In addition, it is obvious that any person having ordinary skill in the art may make various modifications and imitations within the scope without departing from the technical teachings of the present invention.

INDUSTRIAL APPLICABILITY

The system for capturing carbon dioxide and upgrading biogas using the microbubble generator-linked electrodeionization device according to the present invention may reduce costs related to production and maintenance of a biogas production facility and may reduce energy consumption by capturing carbon dioxide, which accounts for 40% of the biogas, so as to enable reuse, and the captured high-purity carbon dioxide may be used for the growth of thermophilic hydrogenotrophic methanogens of the biogas production facility, and when liquefied, is also usable for semiconductor manufacturing, thereby providing very useful industrial applicability.

The invention claimed is:

1. A system for capturing carbon dioxide from biogas and upgrading the biogas, the system comprising:

a biogas supply line configured to supply the biogas;

a NaCl aqueous solution supply line configured to supply a NaCl aqueous solution, the NaCl aqueous solution supply line being fluidly connected to the biogas supply line at a junction such that the carbon dioxide of the biogas is saturated in the NaCl aqueous solution at the junction to form a gas-liquid mixture containing the carbon dioxide saturated in the NaCl aqueous solution;

a microbubble generator disposed downstream of the junction and upstream of and external to an electrodeionization device, the microbubble generator being configured to receive the gas-liquid mixture from the junction and, by rotating a screw, to disperse the carbon dioxide saturated in the NaCl aqueous solution into gas bubbles having a size of 10 to 50 μm; and the electrodeionization device including a stack configuration having a pair of electrodes, and a first bipolar membrane, a basic resin wafer, a cation exchange membrane, an acidic resin wafer, and a second bipolar membrane which are sequentially arranged between the pair of electrodes, wherein the basic resin wafer is disposed between the first bipolar membrane and the cation exchange membrane, the acidic resin wafer is disposed between the cation exchange membrane and the second bipolar membrane, and the first bipolar membrane and the second bipolar membrane respectively separate the basic resin wafer and the acidic resin wafer from the pair of electrodes, and the electrodeionization device is configured to direct the gas-liquid mixture from the microbubble generator sequentially through a basic compartment defined by the basic resin wafer and an acidic compartment defined by the acidic resin wafer.

2. The system of claim 1, wherein the microbubble generator is one of a plurality of microbubble generators arranged in a stack structure separate from the electrodeionization device.

3. The system of claim 1, wherein the electrodeionization device is configured with a pair of cells including the basic resin wafer and the acidic resin wafer separated by the cation exchange membrane.

4. The system of claim 3, wherein the basic compartment is formed by the basic resin wafer and a gasket, and a fluid flow path is formed in the basic resin wafer.

5. The system of claim 4, wherein pH variation in the basic compartment is pH 9 to 11.

6. The system of claim 3, wherein the acidic compartment is formed by the acidic resin wafer and a gasket, and a fluid flow path is formed in the acidic resin wafer.

7. The system of claim 6, wherein pH variation in the acidic compartment is pH 3 to 4.

8. The system of claim 1, wherein an internal stack voltage of the electrodeionization device is 2 V.

9. A method of capturing the carbon dioxide and upgrading the biogas using the system of claim 7, the method comprising:

saturating the carbon dioxide of the biogas in the NaCl aqueous solution at the junction to form the gas-liquid mixture containing the carbon dioxide saturated in the NaCl aqueous solution;

dispersing the carbon dioxide saturated in the NaCl aqueous solution into bubbles having a size of 10 to 50 μm through the microbubble generator; and sequentially passing the gas-liquid mixture containing the dispersed bubbles through the basic compartment and the acidic compartment of the electrodeionization device.

10. The method of claim 9, further comprising:

saturating the carbon dioxide of the biogas in a 1% NaCl aqueous solution;

microbubbling carbon dioxide bubbles saturated in the NaCl aqueous solution and dispersing the same; and sequentially passing a mixture of the biogas and NaCl aqueous solution through the basic compartment and the acidic compartment of a cation exchange membrane (CEM)-based electrodeionization device.

11. The method of claim 10, wherein, as the mixture of the biogas and NaCl aqueous solution passes through the basic compartment of the electrodeionization device, a pH shifts to basic so that the carbon dioxide in the biogas is converted to bicarbonate, whereas methane in the biogas remains in a gaseous state.

12. The method of claim 11, wherein, after the methane in the biogas is separated in a gaseous state, the NaCl aqueous solution rich in bicarbonate passes through the acidic compartment of the electrodeionization device, whereby the pH shifts to acidic so that the bicarbonate in the NaCl aqueous solution is converted into a gaseous carbon dioxide.

13. The method of claim 12, wherein the gaseous carbon dioxide is released in a gas-liquid separator, and decarbonated 1% NaCl aqueous solution is recycled.

14. The method of claim 10, wherein a flow rate ratio (the carbon dioxide mL/NaCl aqueous solution mL) in the saturating of the carbon dioxide of the biogas in the 1% NaCl aqueous solution is 0.6.

15. The system of claim 1, wherein the NaCl aqueous solution is a 1 wt % NaCl aqueous solution.

* * * * *